United States Patent [19]

Guldberg et al.

[11] Patent Number: 5,583,080
[45] Date of Patent: Dec. 10, 1996

[54] THERMOSTABLE AND BIOLOGICALLY SOLUBLE MINERAL FIBRE COMPOSITIONS

[75] Inventors: Marianne Guldberg, Søborg; Vermund R. Christensen, Roskilde, both of Denmark

[73] Assignee: Rockwool International A/S, Hedehusene, Denmark

[21] Appl. No.: 464,742

[22] PCT Filed: Dec. 21, 1993

[86] PCT No.: PCT/DK93/00435

§ 371 Date: Jun. 21, 1995

§ 102(e) Date: Jun. 21, 1995

[87] PCT Pub. No.: WO94/14717

PCT Pub. Date: Jul. 7, 1994

[30] Foreign Application Priority Data

Dec. 29, 1992 [DK] Denmark ................................. 1566/92

[51] Int. Cl.⁶ .......................... C03C 13/06; C03C 3/087
[52] U.S. Cl. ................................. 501/36; 501/35; 501/70
[58] Field of Search ........................... 501/36, 35, 72, 501/38, 70

[56] References Cited

U.S. PATENT DOCUMENTS

| | | | |
|---|---|---|---|
| 4,205,992 | 6/1980 | Mogensen et al. | 501/36 |
| 5,250,488 | 10/1993 | Thelohan et al. | 501/36 |
| 5,312,806 | 5/1994 | Mogensen | 502/36 |
| 5,332,698 | 7/1994 | Nyssen et al. | 501/35 |
| 5,332,699 | 7/1994 | Olds et al. | 501/36 |
| 5,401,693 | 3/1995 | Bauer et al. | 501/38 |

FOREIGN PATENT DOCUMENTS

| | | |
|---|---|---|
| 2662687 | 6/1990 | France . |
| 87/05007 | 8/1987 | WIPO . |
| 92/09536 | 6/1992 | WIPO . |
| 93/22251 | 11/1993 | WIPO . |

Primary Examiner—Mark L. Bell
Assistant Examiner—Louis M. Troilo
Attorney, Agent, or Firm—Watson Cole Stevens Davis, P.L.L.C.

[57] ABSTRACT

A fiberizable mineral composition which is thermostable and has a high dissolution rate in biological fluids includes 53.5–64 w/w % of $SiO_2$, up to 4 w/w % of $Al_2O_3$, 10–20 w/w % of CaO, 10–20 w/w % of MgO, and 6.5–9 w/w % of FeO, the total amount of FeO and $Fe_2O_3$ calculated as FeO. A mineral fiber material made from the composition can be used for thermal and/or acoustic insulation purposes or as a plant growing medium or substrate.

9 Claims, No Drawings

THERMOSTABLE AND BIOLOGICALLY SOLUBLE MINERAL FIBRE COMPOSITIONS

BACKGROUND OF THE INVENTION

1. Field of the Invention

The present invention relates to thermostable mineral compositions, and more specifically, to thermostable mineral compositions which are soluble in biological fluids. Even more specifically, the present invention relates to mineral fibres formed from the mineral compositions and relates to mineral fibre insulation and a mineral fibre plant growing medium made from these compositions.

2. The Prior Art

Mineral fibre insulation is widely used and has been a commercial product for a long period of time. The insulation products are made from mineral raw materials such as rock or slag which are melted and spun into fibres that a binder holds together. The binder is usually a phenol-formaldehyde resin or a urea-modified phenolformaldehyde resin.

It is well known that mineral fibre insulation products are advantageous as compared to glass fibre insulation products in their higher fire resistance, i.e., they have an excellent thermostability. Typically, glass wool withstands temperatures up to around 650° C., whereas mineral wool is capable of withstanding temperatures up to about 1000° C. It is highly desirable to maintain or even increase this excellent property in any modification of the hitherto known mineral fibre products.

Recently, more attention has been given to health issues in connection with various fibrous material, including insulation wool fibres. It is well known that inhalation of certain types of fibres such as asbestos fibres may lead to respiratory diseases, including lung cancer. It is believed that an important factor is the ability of the asbestos fibres to remain in the lung for extended periods of time. Although there has not yet been provided any evidence of manmade fibre being the cause of respiratory or other diseases in man, it is desirable to provide mineral fibres with an increased dissolution rate in biological fluids, since it is expected that such fibres will have a considerably shorter half-time in the lung upon inhalation.

The concern for possible health effects of man-made vitreous fibres (MMVF) has been the reason for a number of investigations in the recent years. It is believed that besides the fibre dimensions, also the time of residence in the lung may be an important parameter for causing disease. The residence time is influenced by the physical clearance of the fibres from the lung and by the rate of dissolution of the fibres.

The rate of dissolution of fibres may be assessed in different ways. In vitro measurements have been applied, subjecting fibres to artificial, physiological solutions (Gamble's solution, modified according to the disclosure in Scholze, H. Conradt.: An in vitro study of the chemical durability of siliceous fibres. Ann. Occ. Hyg. 31, p. 683–692, (1987)), believed to resemble the conditions in the lung fluids. The liquids used are all characterised by having a pH of 7.4–7.8. It is known from Carr, Ian: The Macrophage - A Review of Ultrastructure and Function. Academic Press, (1973), that the pH in the macrophages is different, more acidic, than that of the lung fluid, resembled by the normally used liquids.

Recent published measurements of fibre durability, including in vivo measurements of the fibre dissolution in rat lungs indicate that this difference in pH may account for different rates of dissolution, and it is demonstrated that the investigated fibres: when sufficiently short, may be engulfed by the macrophages and this might explain the lower rate of dissolution observed for shorter glass wool fibres.

WO 89/12032 discloses inorganic mineral fibre compositions among which some have passed the ASTM E-119 two hour fire test as well as exhibit low durabilities in physiological saline solutions, i.e. have high dissolution rates therein. The components of the disclosed compositions may vary considerably. However, all the disclosed compositions are made from pure metal oxides or from less pure raw materials with addition of pure oxides which make the disclosed compositions very costly.

SUMMARY OF THE INVENTION

The object of the present invention is to provide a fiberisable mineral composition which can be made from naturally occurring and inexpensive raw materials which has a high dissolution rate in biological fluids and exhibits a good thermostability.

The present invention provides a fiberisable mineral composition which is thermostable and has a high dissolution rate in biological fluids and which consists essentially of $SiO_2$ 53.5–64 w/w %

$Al_2O_3$ ≦4 w/w %

CaO 10–20 w/w %

MgO 10–20 w/w %

FeO 6.5–8 w/w %, the total amount of FeO and $Fe_2O_3$ calculated as FeO.

Surprisingly, it has been found that mineral fibres having both a high dissolution rate in biological fluids and a good thermostability can be formed from mineral compositions of naturally occurring raw materials and other inexpensive raw materials such as olivine, quartz, dolomite, calcareous sandstone and iron ore, optionally fully or partly bonded with cement into briquettes.

The compositions of the invention may, e.g., be prepared from the following naturally occurring raw materials:

Quartz sand about 36%

Olivine sand about 17%

Mineral wool waste about 12%

Iron ore about 12%

Dolomite about 11% and

Cement anout 12%.

According to the present invention, a range for the total amount of CaO, MgO, $Fe_2O_3$ and FeO in the mineral composition of the invention is preferably:

32 w/w % ≦ CaO+MgO+FeO/$Fe_2O_3$ ≦ 40 w/w %, more preferably 35 w/w % ≦ CaO+MgO+FeO/$Fe_2O_3$ ≦ 40 w/w %, especially 38 w/w % ≦ CaO+MgO+FeO/$Fe_2O_3$ ≦ 40 w/w %.

The mineral composition of the present invention is particularly suitable for the manufacture of mineral fibres by the method disclosed, e.g., in WO 92/06047.

For the manufacturing of fine fibres, e.g., by this method, a composition having a viscosity of approximately 15 poise at the working temperature is necessary. On the other hand, it is also desirable that the melt composition has a viscosity not lower than approximately 4 poise at the working temperature.

It is not obvious that the dissolution rate of the mineral fibre composition can be increased while maintaining other necessary properties. As mentioned above, the melt viscosity must be maintained within a narrow range in order to allow fiberisation by the manufacturing methods currently in use. The resulting mineral wool must be sufficiently durable to maintain its physical integrity throughout the life-time of the building, ship or other location of final use. Furthermore, the resulting mineral wool must be sufficiently thermostable to provide excellent fire resistance to the final insulation product.

The viscosity of a mineral melt composition is dependent on the total content of silica and alumina: high total silica and alumina results in a high viscosity and vice versa. Accordingly, the viscosity provides certain restrictions on how the composition can be modified.

It is believed that the amount of magnesia and ferrous/ferric oxide components in a mineral composition has a significant influence on the thermostability of the mineral fibre. The ferrous/ferric oxide plays the important role of a crystal nucleating agent in the conversion of the mineral fibre material from an amorphous condition to a crystalline or pseudo crystalline state during external influence of heat, e.g., during fire. Accordingly, this provides certain restrictions on the minimum amount of ferrous/ferric oxide component present in the composition. It should be noted that mineral fibre material without ferrous or ferric oxide may be capable of withstanding high temperatures which are reached by slow heat-up in contrast to the fast heat-up resulting e.g., from external fire. As mentioned above, when mineral fibre material is subjected to fire (sudden and/or fast heat-up), the structure of the material, i.e. the mineral wool, is converted from an amorphous condition to a crystalline state and, accordingly, the thermostability of the mineral fibre material requires the presence of a crystal nucleating agent in the fibre material. On the other hand, it is also expected, e.g., from WO 89/12032, that the presence of alumina and ferrous/ferric oxide components in the mineral composition has a significant negative influence on the rate of dissolution, cf. below.

The rate of dissolution or durability, however, provides the most complicated restriction. The mineral wool must be relatively inert to moisture attack at the installation site, but it must dissolve quickly in the lung. Since both these situations involve water attack on the fibres under nearneutral acid-base conditions, it is also surprising that this requirement can be met by compositional modifications.

In the present specification and claims, the term "biological fluid" denotes physiological salt or saline solutions as well as any fluid present in vivo in mammals.

Another advantageous fiberisable mineral composition of the invention consists essentially of:

$SiO_2$ 53.5–63 w/w %

$Al_2O_3 \leq 4$ w/w %

CaO 15–20 w/w %

MgO 10–15 w/w %

FeO 6.5–8 w/w %, the total amount of FeO and $Fe_2O_3$ calculated as FeO.

The present invention also relates to mineral fibre material made from a mineral composition according to the invention.

In a preferred embodiment of the invention, mineral fibre material according to the invention preferably has a sintering temperature of at least 900° C., more preferably at least 1000° C., especially at least 1100° C.

The invention further relates to a method of increasing the rate of dissolution in a biological fluid of a thermostable mineral fibre material, in which method a composition according to the invention is used for preparing the mineral fibre material.

The mineral fibre material according to the invention which is thermostable and has a high dissolution rate in biological fluids is useful for thermal and/or acoustic insulation purposes or as a plant growing medium or substrate.

Yet another advantageous fiberisable mineral composition of the invention consists essentially of:

$SiO_2$ 54.5–63 w/w %

$Al_2O_3$ 1–4 w/w %

CaO 15–20 w/w %

MgO 11–16 w/w %,

FeO 6.5–8 w/w %, the total amount of FeO and $Fe_2O_3$ calculated as FeO.

EXAMPLE 1

The dissolution rate and the thermostability of mineral fibres made from known compositions or comparative compositions and a composition of the invention, respectively, was determined as described below. The fibres were made by melting the mineral composition to be tested in a cupola furnace, followed by spinning the fibre material into mineral wool. Binder was not applied.

The following mineral fibre compositions were tested:

Composition A: Commercial mineral fibres manufactured by Rockwool Lapinus B.V., Roermond, Netherlands.

Composition B, C, and D: Comparative compositions

Composition E, F, G, I: Mineral fibres according to the invention.

The constituents of each test composition is shown in Table 1. It is to be understood that in addition to the constituents mentioned in Table 1, each of the tested fibre compositions contained up to a total of 2 w/w % of other constituents (traces) forming part of the raw materials used. Such other constituents may include, for example, manganous oxide, chromium oxide, and various sulfur compounds. However, the percentages in Table 1 are standardised to a total of 100 w/w % of the listed constituents.

TEST METHODS

Dimensions of the Fibre Samples

The samples were sieved, and the fraction below 63 µm was used for the tests.

For each sample, the fibre diameter distribution was determined, measuring the diameter and length of 200 individual fibres by means of an optical microscope (1000× magnification). The readings were used for calculating the specific surface of the fibre samples, taking into account the density of the fibres.

Measurements of Rate of Dissolution (Stationary Set-Up)

300 mg of fibres were placed in polyethylene bottles containing 500 ml of a modified Gamble's solution (i.e., with complexing agents) at pH 7.5. Once a day the pH was checked and if necessary adjusted by means of HCl.

The tests were carried out during a one week period. The bottles were kept in water bath at 37° C. and shaken vigorously twice a day. Aliquots of the solution were taken out after one and four days and analysed for Si on an Perkin-Elmer Atomic Absorption Spectrophotometer.

The modified Gamble's solution, adjusted to pH 7.5±0.2, had the following composition:

|  | g/l |
|---|---|
| $MgCl_2.6H_2O$ | 0.212 |
| NaCl | 7.120 |
| $CaCl_2.2H_2O$ | 0.029 |
| $Na_2SO_4$ | 0.079 |
| $Na_2HPO_4$ | 0.148 |
| $NaHCO_3$ | 1.950 |
| $(Na_2$-tartrate$).2H_2O$ | 0.180 |
| $(Na_3$-citrate$).2H_2O$ | 0.152 |
| 90% Lactic acid | 0.156 |
| Glycine | 0.118 |
| Na-pyruvate | 0.172 |
| Formalin | 1 ml |

Calculations

Based on the dissolution of $SiO_2$ (network dissolution), the specific thickness dissolved was calculated and the rate of dissolution established (nm/day). The calculations were based on the $SiO_2$ content in the fibres, the specific surface and the dissolved amount of Si.

Thermostability

The thermostability expressed as the sintering temperature of the fibre compositions A-I was established by the following method:

A sample (5×5×7.5 cm) of mineral wool made of the fibre composition to be tested was placed in a furnace pre-heated to 700° C. After 0.5 hours exposure the shrinkage and the sintering of the sample was evaluated. The method was repeated each time with a fresh sample and a furnace temperature 50° C. above the previous furnace temperature until the maximum furnace temperature, at which no sintering or no excessive shrinkage of the sample was observed, was determined.

The test results are shown in Table 2 below.

TABLE 1

| | Components in w/w % | | | | | | | |
|---|---|---|---|---|---|---|---|---|
| | Comparative compositions | | | | Inventive compositions | | | |
| | A | B | C | D | E | F | G | I |
| $SiO_2$ | 46.8 | 50.8 | 58.6 | 61.3 | 61.5 | 54.9 | 56.4 | 60.2 |
| $Al_2O_3$ | 13.2 | 0.8 | 3.7 | 0.8 | 0.7 | 4.0 | 2.7 | 0.3 |
| $TiO_2$ | 2.9 | 0.1 | 0.5 | 0.2 | 0.2 | 0.6 | 0.5 | 0.1 |
| FeO | 6.3 | 0.1 | 6.0 | 4.1 | 7.2 | 6.8 | 7.3 | 7.9 |
| CaO | 17.2 | 31.0 | 23.6 | 12.8 | 13.1 | 17.2 | 17.0 | 20.0 |
| MgO | 9.6 | 17.0 | 6.8 | 20.3 | 16.9 | 15.3 | 15.1 | 11.1 |
| $Na_2O$ | 2.8 | 0.1 | 0.2 | 0.1 | 0.1 | 0.5 | 0.4 | 0.1 |
| $K_2O$ | 1.2 | 0.1 | 0.6 | 0.4 | 0.3 | 0.7 | 0.6 | 0.3 |

TABLE 2

| Comp. | A | B | C | D | E | F | G | I |
|---|---|---|---|---|---|---|---|---|
| Sintering temp. (°C.) | 1050 | 750 | 750 | 800 | 1050 | 1050 | 1100 | 1100 |
| Dissolution* pH = 7.5 | 3 | 45 | 6 | 32 | 25 | 12 | 13 | 20 |

*: Dissolution rate of Si (nm/day), 1st–4th day

The test results clearly demonstrate that the fibres formed from the composition of the invention have a very good thermostability—expressed as a sintering temperature of 900° C., 1050° C. and 1100° C., respectively—in comparison with the comparative fibres. The commercial product (composition A) exhibits also a high thermostability whereas the comparison compositions B, C, and D exhibit relatively poor thermostabilities.

Furthermore, the test results clearly demonstrate that the dissolution rate of the inventive compositions is increased by a factor 4–8 compared with the commercial product (composition A).

The comparative compositions B and D have both a considerably higher dissolution rate than the compositions A and C. These results are not surprising, since the total amount of alumina and ferrous oxide in composition B and D, respectively, is about 1 w/w %. The sintering temperature, however, is unacceptably low.

The compositions D and E differ only in the content of FeO and MgO. The inventive composition E (FeO of 7.1%) has a significantly higher thermostability than the comparative composition D (FeO of 4.2%) whereas the dissolution rate of the D and E composition, respectively, are of the same order of magnitude.

By comparing the comparative compositions B, C and the inventive compositions E-I it is seen that it is possible to obtain an increased sintering temperature by decreasing the content of CaO.

From the results it is concluded that the mineral fibres made from the compositions of the invention have excellent thermostabilities as well as high dissolution rates in biological fluids.

EXAMPLE 2

Biodurability Study

A biodurability study, i.e., an examination of the physiological compatibility in vivo, of a commercial mineral fibre having the chemical composition as the above-mentioned composition A and an inventive mineral fibre of the above-mentioned composition G was carried out.

MATERIALS AND METHODS

For each sample of test material a small fraction was suspended in double-distilled water, sonified and filtered on a Nuclepore filter (pore size 0.2 or 0.4 µm). A part of the filter was mounted on an aluminium stub and sputtered with about 30 nm of gold. These samples were analysed by a Cambridge Stereoscan 360 scanning electron microscope (SEM). Magnification was chosen to enable the measurement of both the longest fibres and the thinnest fibres with sufficient precision. The length and the diameter of about 400 fibres of each sample were measured, cf. table 3.

A total of 2 mg of fibres per rat was suspended in 0.3 ml of 0.9% NaCl solution and instilled intratracheally in a single dose into the lungs of female Wistar rats at a body weight of about 200 g. 5 animals per group were sacrificed after 2 days, 2 weeks, 1, 3, 6 and 12 months.

After sacrifice, the lungs were isolated and dried at 105° C. in an oven and subjected to low-temperature ashing. This procedure did not influence on the size distribution of test material; this was checked by comparing lung ash samples from sacrification two days after intratracheal instillation with the corresponding initial test material (Table 3). A fraction of the ashed lung was suspended in filtered water and filtered on a Nuclepore filter (pore size 0.2 and 0.4 μm) within 15 minutes. These samples were prepared and analysed by SEM as described for the characterisation of the test material. For each sample 200 fibres were measured on SEM videoprints or photos and the total number of fibres per lung was calculated for each animal. Additionally the size distribution of the fibres was analysed. From the shape of the fibres the volume of the particles was estimated assuming cylindrical geometry. For calculation of clearance kinetics there was performed a logarithmic regression analysis of number or mass of fibres versus time after instillation of the individual animals. The resulting clearance rate constants k with their 95% confidence limit were converted to the corresponding half-times $T_{1/2}$ by the equation $T_{1/2}=\ln(2)/k$.

Results

The analysis of fibres in the ashed lungs are presented in Table 4 and Table 5. The elimination of fibres can be described by a first order kinetic, i.e. the elimination kinetics can be defined by the half-times which are shown in Table 6 and 7.

From Table 7 it is seen that composition G has a significant lower half-time than composition A even by a clearly higher initial fibre diameter (cf. Table 3).

Based on research with long and short asbestos fibres [John Davis: The pathogenicity of long versus short fibre sample of amosite asbestos, Brit. 7. Exp. Pathology 67, p. 415–430 (1986)] it is believed that the long fibres are the biological most active.

From Table 8 it is seen that for long fibres there is a statistical significant difference between the known commercial mineral wool (composition A) and the inventive fibres (composition G).

Half-life time determinations only considering fibres longer than 5 μm may be interpreted wrongly, because long fibres fragmentates to shorter fibres thereby increasing the $T_{1/2}$ for the shorter fractions.

TABLE 3

| | | Size distribution of test materials (weighing by number of fibres). | | | | | | | | |
|---|---|---|---|---|---|---|---|---|---|---|
| Test material | Sacrifice | Fibres counted (L/D > 5) | Fibre length [μm] | | | | Fibre diameter [μm] | | | |
| | | | 10%< | 50%< | 90%< | $\sigma_g$ | 10%< | 50%< | 90%< | $\sigma_g$ |
| Composition A | Initial material | 323 | 3.4 | 6.7 | 15.2 | 1.7 | 0.32 | 0.63 | 1.21 | 1.72 |
| | 2 days | 702 | 2.9 | 6.8 | 15.9 | 1.9 | 0.27 | 0.62 | 1.19 | 1.95 |
| | 1 month | 724 | 3.0 | 6.9 | 17.1 | 1.9 | 0.24 | 0.62 | 1.24 | 2.10 |
| | 3 months | 732 | 3.0 | 7.1 | 17.0 | 2.0 | 0.28 | 0.66 | 1.22 | 1.97 |
| | 6 months | 784 | 3.5 | 7.3 | 17.0 | 1.8 | 0.29 | 0.66 | 1.24 | 1.89 |
| | 12 months | 772 | 3.0 | 6.4 | 14.0 | 1.8 | 0.24 | 0.60 | 1.07 | 2.07 |
| Composition G | Initial material | 317 | 4.8 | 9.3 | 23.1 | 1.7 | 0.57 | 1.02 | 1.59 | 1.57 |
| | 2 days | 631 | 4.1 | 9.3 | 24.0 | 1.9 | 0.35 | 0.87 | 1.56 | 2.05 |
| | 1 month | 822 | 4.3 | 10.2 | 24.1 | 2.0 | 0.36 | 0.88 | 1.55 | 2.03 |
| | 3 months | 768 | 4.0 | 9.3 | 22.6 | 1.9 | 0.37 | 0.84 | 1.54 | 1.91 |
| | 6 months | 618 | 4.1 | 8.8 | 19.2 | 1.8 | 0.32 | 0.77 | 1.41 | 2.01 |
| | 12 months | 746 | 3.3 | 7.6 | 15.7 | 1.9 | 0.25 | 0.69 | 1.30 | 2.17 |

TABLE 4

| | | SEM analysis of fibers in the lung ash | | | | | | | |
|---|---|---|---|---|---|---|---|---|---|
| | | Fibers counted per lung sample | | Fibers [10⁶/lung] | | Fibers (L > 5 μm) [10⁶/lung] | | Calculated mass of fibers [mg] | |
| | | Mean | S.D. | Mean | S.D. | Mean | S.D. | Mean | S.D. |
| Test material | Sacrifice date | | | | | | | | |
| Composition A | 2 Days | 222 | 11 | 124.1 | 17.0 | 53.1 | 6.3 | 1.67 | 0.30 |
| | 1 Month | 222 | 11 | 111.9 | 12.3 | 50.4 | 6.7 | 1.64 | 0.48 |
| | 3 Months | 220 | 8 | 92.0 | 10.8 | 44.9 | 3.3 | 1.41 | 0.29 |
| | 6 Months | 215 | 5 | 45.2 | 10.0 | 24.1 | 4.5 | 0.69 | 0.06 |
| | 12 Months | 208 | 12 | 50.8 | 10.5 | 24.5 | 4.7 | 0.69 | 0.26 |
| Composition G | 2 Days | 222 | 8 | 61.0 | 9.0 | 39.3 | 6.3 | 1.96 | 0.18 |
| | 1 Month | 220 | 6 | 47.9 | 4.2 | 31.9 | 2.5 | 1.62 | 0.41 |
| | 3 Months | 216 | 2 | 41.1 | 3.4 | 25.8 | 1.6 | 1.19 | 0.15 |
| | 6 Months | 217 | 4 | 24.0 | 6.0 | 14.6 | 4.0 | 0.52 | 0.20 |
| | 12 Months | 199 | 13 | 17.1 | 5.7 | 10.2 | 3.1 | 0.26 | 0.08 |

TABLE 5

Mean diameter of fibres of different lenght fractions of test materials in the lung ash
Mean of diameter [μm] of different length fractions

| Sacrifice date | <2.5μ | | 2.5–5μ | | 5–10 μm | | 10–20 μm | | 20–30 μm | | >40 μm | | ALL | |
|---|---|---|---|---|---|---|---|---|---|---|---|---|---|---|
| | Mean | S.D. | Mean | S.D. | Mean | S.D. | Mean | S.D. | Mean | S.D. | Mean | S.D. | Mean | S.D. |
| Composition A | | | | | | | | | | | | | | |
| 2 days | 0.63 | 0.04 | 0.76 | 0.04 | 0.84 | 0.02 | 0.88 | 0.09 | 1.07 | 0.22 | 1.27 | 0.23 | 0.91 | 0.25 |
| 1 month | 0.61 | 0.05 | 0.75 | 0.03 | 0.86 | 0.08 | 0.86 | 0.13 | 0.94 | 0.12 | 1.35 | 0.31 | 0.89 | 0.27 |
| 3 months | 0.60 | 0.05 | 0.74 | 0.03 | 0.84 | 0.05 | 0.89 | 0.11 | 0.96 | 0.31 | 1.33 | 0.14 | 0.89 | 0.27 |
| 6 months | 0.61 | 0.09 | 0.74 | 0.06 | 0.81 | 0.06 | 0.92 | 0.10 | 0.97 | 0.10 | 1.24 | 0.20 | 0.88 | 0.23 |
| 12 months | 0.52 | 0.03 | 0.66 | 0.05 | 0.76 | 0.05 | 0.78 | 0.10 | 1.10 | 0.39 | 1.51 | 0.23 | 0.89 | 0.38 |
| Composition G | | | | | | | | | | | | | | |
| 2 days | 0.72 | 0.05 | 0.87 | 0.04 | 0.99 | 0.09 | 1.09 | 0.02 | 1.24 | 0.07 | 1.60 | 0.09 | 1.09 | 0.29 |
| 1 month | 0.68 | 0.04 | 0.86 | 0.05 | 0.96 | 0.07 | 1.10 | 0.06 | 1.17 | 0.15 | 1.62 | 0.26 | 1.06 | 0.32 |
| 3 months | 0.69 | 0.05 | 0.88 | 0.02 | 0.99 | 0.03 | 1.08 | 0.08 | 1.16 | 0.30 | 1.54 | 0.31 | 1.06 | 0.31 |
| 6 months | 0.64 | 0.08 | 0.87 | 0.05 | 0.93 | 0.06 | 0.91 | 0.16 | 1.17 | 0.26 | 1.53 | 0.36 | 1.01 | 0.33 |
| 12 months | 0.50 | 0.06 | 0.71 | 0.04 | 0.84 | 0.06 | 0.91 | 0.04 | 1.07 | 0.16 | 1.59 | 0.24 | 0.94 | 0.36 |

TABLE 6

Half-time for elimination of fibres of different length fractions of test materials in the lung ash.

| | Half-time (days) calculated from number of fibres of different length fraction | | | |
|---|---|---|---|---|
| Test material | <2.5 μm Mean (95% CL.) | 2.5–5 μm Mean (95% CL.) | 5–10 μm Mean (95% CL.) | 10–20 μm Mean (95% CL.) |
| Composition A | 201 (136–379) | 251 (185–392) | 318 (229–520) | 279 (217–391) |
| Composition G | 241 (170–413) | 219 (168–317) | 211 (172–274) | 185 (146–254) |

| | Half-time (days) calculated from number of fibres of different length fraction | | |
|---|---|---|---|
| Test material | 20–40 μm Mean (95% CL.) | >40 μm Mean (95% CL.) | ALL Mean (95% CL.) |
| Composition A | 191 (148–271) | 158 (121–227) | 257 (195–376) |
| Composition G | 108 (91–133) | 100 (89–116) | 196 (159–255) |

TABLE 7

Half-time and 95% confidence limit (C.L.) of the elimination of fibers

| | Half-time (days) calculated from | | |
|---|---|---|---|
| | Number of Particles | Number of Fibers (L > 5 μm, D < 3 μm) | Mass of Particles |
| | Mean (95% C.L.) | Mean (95% C.L.) | Mean (95% C.L.) |
| Comp. A | 257 (195–376) | 291 (227–406) | 249 (187–372) |
| Comp. G | 196 (159–255) | 183 (151–233) | 122 (105–145) |

TABLE 8

Comparison of $T_{1/2}$ (days; based on number of fibres)

| | 20–40 μm Mean (95% C.L.) | >40 μm Mean (95% C.L.) |
|---|---|---|
| Composition A (known mineral wool) | 191 (148–271) | 158 (121–227) |
| Composition G (inventive composition) | 108 (92–133) | 100 (89–116) |

We claim:

1. A fiberisable mineral composition which is thermostable and has a high dissolution rate in biological fluids and which consists of:

$SiO_2$ 53.5–64 w/w %

$Al_2O_3 \leqq 4$ w/w %

CaO 10–20 w/w %

MgO 10–20 w/w %

FeO 6.5–9 w/w %

$TiO_2$ up to about 0.6 w/w %

$Na_2O$ up to about 0.5 w/w %

$K_2O$ up to about 0.7 w/w %, the total amount of FeO and $Fe_2O_3$ calculated as FeO, and up to about 2 w/w % of trace compounds selected from the group consisting of manganous oxide, chromium oxide and sulfur compounds.

2. A mineral composition according to claim 1, which consists of $SiO_2$ 53.5–62 w/w %

$Al_2O_3 \leqq 4$ w/w %

CaO 15–20 w/w %

MgO 10–15 w/w %

FeO 6.5–8 w/w %, the total amount of FeO and $Fe_2O_3$ calculated as FeO.

3. A mineral composition according to claim 1, wherein the total amount of CaO, MgO, $Fe_2O_3$ and FeO is:

$$32 \text{ w/w \%} \leqq CaO+MgO+FeO+Fe_2O_3 \leqq 40 \text{ w/w \%}.$$

4. A mineral composition according to claim 3, wherein the total amount of CaO, MgO, $Fe_2O_3$ and FeO is:

$$35 \text{ w/w \%} \leqq CaO+MgO+FeO+Fe_2O_3 \leqq 40 \text{ w/w \%}.$$

5. A mineral composition according to claim 4, wherein the total amount of CaO, MgO, FeO and $Fe_2O_3$ is:

$$38 \text{ w/w \%} \leqq CaO+MgO+FeO+Fe_2O_3 \leqq 40 \text{ w/w\%}.$$

6. A mineral fibre material which is thermostable, and has a high dissolution rate in biological fluids, and is made from a mineral composition according to claim 1.

7. A mineral fibre material according to claim 6 which has a sintering temperature of at least 900° C.

8. A mineral fibre material according to claim 7 which has a sintering temperature of at least 1000° C.

9. A mineral fibre material according to claim 8 which has a sintering temperature of at least 1100° C.

* * * * *